(12) United States Patent
Bard et al.

(10) Patent No.: US 10,827,596 B2
(45) Date of Patent: Nov. 3, 2020

(54) CONTROLLING GROUPS OF ELECTRICAL LOADS VIA MULTICAST AND/OR UNICAST MESSAGES

(71) Applicant: Lutron Technology Company LLC, Coopersburg, PA (US)

(72) Inventors: Benjamin F. Bard, Nazareth, PA (US); Thomas Lee Olson, Pennsburg, PA (US); David T. Saveri, III, Nazareth, PA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/542,959

(22) Filed: Aug. 16, 2019

(65) Prior Publication Data

US 2020/0045799 A1    Feb. 6, 2020

Related U.S. Application Data

(63) Continuation of application No. 15/642,157, filed on Jul. 5, 2017, now Pat. No. 10,426,017.
(Continued)

(51) Int. Cl.
*H05B 47/19*       (2020.01)
*H05B 47/105*     (2020.01)
(Continued)

(52) U.S. Cl.
CPC ......... *H05B 47/19* (2020.01); *H04L 12/2816* (2013.01); *H05B 47/105* (2020.01);
(Continued)

(58) Field of Classification Search
CPC ............ H05B 37/0272; H05B 37/0227; H05B 37/0218; H05B 37/0254; H05B 37/029;
(Continued)

(56) References Cited

U.S. PATENT DOCUMENTS

| 5,248,919 A | 9/1993 | Hanna et al. |
| 5,264,761 A | 11/1993 | Johnson |

(Continued)

FOREIGN PATENT DOCUMENTS

| CN | 2596671 Y | 12/2003 |
| WO | 2012/085738 A1 | 6/2012 |
| WO | 2016/046005 A2 | 3/2016 |

*Primary Examiner* — Borna Alaeddini
(74) *Attorney, Agent, or Firm* — Flaster Greenberg, P.C.

(57) ABSTRACT

A load control system may include control devices for controlling electrical loads. The control devices may include load control devices, such as a lighting device for controlling an amount of power provided to a lighting load, and input devices, such as a remote control device configured to transmit digital messages comprising lighting control instructions for controlling the lighting load via the lighting device. The remote control device may communicate with the lighting device via an intermediary device, such as a hub device. The remote control device may detect a user interface event, such as a button press or a rotation of the remote control device. The remote control device or the hub device may determine whether to transmit digital messages to as unicast messages or multicast messages based on the type of user interface event detected.

20 Claims, 9 Drawing Sheets

Related U.S. Application Data

(60) Provisional application No. 62/358,555, filed on Jul. 5, 2016.

(51) Int. Cl.

| | | |
|---|---|---|
| *H04L 12/28* | (2006.01) | |
| *H05B 47/11* | (2020.01) | |
| *F24F 11/30* | (2018.01) | |
| *F24F 11/58* | (2018.01) | |
| *F24F 11/62* | (2018.01) | |
| *H04W 4/80* | (2018.01) | |
| *A47H 5/02* | (2006.01) | |
| *E06B 9/32* | (2006.01) | |
| *E06B 9/68* | (2006.01) | |
| *G06F 3/16* | (2006.01) | |
| *H04L 29/08* | (2006.01) | |

(52) U.S. Cl.
CPC ............... *H05B 47/11* (2020.01); *A47H 5/02* (2013.01); *A47H 2005/025* (2013.01); *E06B 9/32* (2013.01); *E06B 9/68* (2013.01); *E06B 2009/6827* (2013.01); *F24F 11/30* (2018.01); *F24F 11/58* (2018.01); *F24F 11/62* (2018.01); *G06F 3/165* (2013.01); *H04L 67/12* (2013.01); *H04W 4/80* (2018.02)

(58) Field of Classification Search
CPC ............ H05B 37/0245; H05B 37/0281; H05B 37/02; H05B 37/0236; H05B 37/0263; H05B 37/034; H05B 47/19; H05B 47/105
See application file for complete search history.

(56) References Cited

U.S. PATENT DOCUMENTS

| | | | |
|---|---|---|---|
| 6,803,728 B2 | 10/2004 | Balasubramaniam et al. | |
| 7,787,485 B2 | 8/2010 | Howe et al. | |
| 7,834,856 B2 | 11/2010 | Grinshpoon et al. | |
| 7,889,051 B1 | 2/2011 | Billig et al. | |
| 8,009,042 B2 | 8/2011 | Steiner et al. | |
| 8,199,010 B2 | 6/2012 | Sloan et al. | |
| 8,228,184 B2 | 7/2012 | Blakeley et al. | |
| 8,330,638 B2 | 12/2012 | Altonen et al. | |
| 8,410,706 B2 | 4/2013 | Steiner et al. | |
| 8,451,116 B2 | 5/2013 | Steiner et al. | |
| 8,471,687 B2 | 6/2013 | Steiner et al. | |
| 8,471,779 B2 | 6/2013 | Mosebrook | |
| 8,786,196 B2 | 7/2014 | Biery et al. | |
| 9,208,965 B2 | 12/2015 | Busby et al. | |
| 9,418,802 B2 | 8/2016 | Romano et al. | |
| 9,520,247 B1 | 12/2016 | Finnegan et al. | |
| 9,531,632 B2 | 12/2016 | Hellhake et al. | |
| 9,583,288 B2 | 2/2017 | Jones et al. | |
| 9,633,557 B2 | 4/2017 | Dimberg et al. | |
| 9,655,214 B1 | 5/2017 | Sooch | |
| 9,655,215 B1 | 5/2017 | Ho et al. | |
| 9,674,931 B1* | 6/2017 | Chen | H05B 45/20 |
| 9,799,469 B2 | 10/2017 | Bailey et al. | |
| 9,959,997 B2 | 5/2018 | Bailey et al. | |
| 10,426,017 B2* | 9/2019 | Bard | H05B 37/0218 |
| 10,448,482 B2* | 10/2019 | Dableh | H05B 47/155 |
| 2005/0180447 A1 | 8/2005 | Lim | H04L 12/185 370/432 |
| 2008/0111491 A1 | 5/2008 | Spira | |
| 2009/0116579 A1 | 5/2009 | Abraham et al. | |
| 2009/0150943 A1 | 6/2009 | Vasudevan et al. | |
| 2009/0206983 A1 | 8/2009 | Knode et al. | |
| 2011/0068900 A1 | 3/2011 | Billig et al. | |
| 2011/0314163 A1 | 12/2011 | Borins et al. | |
| 2012/0261078 A1* | 10/2012 | Adams | E06B 9/32 160/6 |
| 2012/0286940 A1 | 11/2012 | Carmen, Jr. et al. | |
| 2013/0030589 A1 | 1/2013 | Pessina et al. | |
| 2013/0214609 A1 | 8/2013 | Carmen, Jr. | |
| 2014/0001977 A1 | 1/2014 | Zacharchuk et al. | |
| 2014/0132475 A1 | 5/2014 | Bhutani et al. | |
| 2014/0177469 A1 | 6/2014 | Neyhart | |
| 2014/0180487 A1 | 6/2014 | Bull | |
| 2014/0231032 A1 | 8/2014 | Blair | |
| 2014/0265568 A1 | 9/2014 | Crafts et al. | |
| 2014/0265881 A1 | 9/2014 | Karc et al. | |
| 2015/0015377 A1 | 1/2015 | Bull et al. | |
| 2015/0051717 A1 | 2/2015 | Krutsch et al. | |
| 2015/0077021 A1 | 3/2015 | Smith et al. | |
| 2015/0295411 A1 | 10/2015 | Courtney et al. | |
| 2015/0351191 A1 | 12/2015 | Pope et al. | |
| 2016/0073479 A1 | 3/2016 | Erchak et al. | |
| 2016/0353559 A1 | 12/2016 | Mann | |
| 2017/0105176 A1 | 4/2017 | Finnegan et al. | |
| 2017/0208672 A1* | 7/2017 | Goergen | H04L 12/00 |
| 2017/0238398 A1 | 8/2017 | Ho et al. | |
| 2017/0311415 A1* | 10/2017 | Rozendaal | A63F 13/28 |
| 2018/0190451 A1 | 7/2018 | Scruggs | |

\* cited by examiner

US 10,827,596 B2

CONTROLLING GROUPS OF ELECTRICAL LOADS VIA MULTICAST AND/OR UNICAST MESSAGES

CROSS-REFERENCE TO RELATED APPLICATIONS

This application is a continuation of U.S. patent application Ser. No. 15/642,157, filed Jul. 5, 2017, which claims the benefit of U.S. Provisional Patent Application No. 62/358,555, filed Jul. 5, 2016, the entire disclosures of which are each incorporated by reference herein.

BACKGROUND

A user environment, such as a residence or an office building, for example, may be configured using various types of load control systems. A lighting control system may be used to control the lighting loads in a user environment. The lighting control system may include various devices, such as input devices and load control devices, capable of communicating via radio frequency (RF) communications. For example, a remote control device may be used to communicate with lighting devices (e.g., light bulbs) in the load control system to control the lighting level of the lighting devices. The devices may communicate in a network using RF communications, such as ZIGBEE® communications; BLUETOOTH® communications; or proprietary communications, such as CLEAR CONNECT™.

In a wireless communications network, the remote control device can control a group of lighting devices using multicast messages. The remote control device may send multicast messages with a group identifier. The lighting devices that are associated with the group identifier will perform lighting control thereon according to the command in the multicast message. The lighting devices will then forward the message to other neighboring lighting devices to identify the group identifier and perform lighting control if associated with the group identifier.

The number of multicast messages sent in the wireless communication network may be limited according to a standard and/or to prevent interference or link saturation on the network. For example, in a ZIGBEE® home automation network, a remote control device may be prevented from controlling lighting devices using more than nine (9) multicast messages over a nine (9) second period of time. If the remote control device exceeds the limit, the lighting devices will lock up for a period of time (e.g., a number of seconds) before allowing control from another message. Thus, the use of multicast messages may have a rate limit, which may cause communications to the lighting devices to be stopped when the rate limit is exceeded, or limiting the lighting levels to be discrete or choppy, which may be undesirable.

In a wireless communications network, the remote control device can alternatively control a group of lighting devices using unicast messages. The remote control device may send independent unicast messages directly to each of the associated lighting devices. Each unicast message may include a unique identifier of the remote control device and a unique identifier of the lighting device for being controlled according to the command in the unicast message. As the unicast messages may be communicated to each lighting device in the group individually, the use of unicast messages for controlling the lighting level of lighting devices in a group may cause each lighting device in the group to turn on, turn off, or adjust the lighting intensity at different times, which may be distracting and undesirable.

SUMMARY

A load control system may include load control devices for directly controlling electrical power supplied to electrical loads, and input devices configured to transmit commands or signals to the load control devices to cause the load control devices to control the electrical loads. Load control devices may include a lighting device for controlling an amount of power provided to a lighting load, an audio device for controlling a speaker, an HVAC device for controlling temperature, or other similar load control devices which control electrical loads in a system. Input devices may include remote control devices, which may be battery powered, solar powered, mechanically powered, etc., wired control devices, or plug-in control devices.

The remote control device may be a retrofit remote control device capable of covering a switch installed on the wall-mounted load control device. The remote control device may communicate with the lighting device via an intermediary device, such as a hub device. The hub device may communicate with the lighting device and the remote control device via the same or different protocols.

The remote control device may detect a user interface event. The user interface event may be a button press, a button hold, a rotation of the remote control device, or a portion thereof, by a defined amount, a soft button press, etc., or any combination of these. The remote control device or the hub device may determine whether to transmit digital messages as unicast messages or multicast messages based on the type of user interface event detected. The remote control device or the hub device may determine whether the user interface event is an on event or an off event for turning the lighting load on or off. When the user interface event is determined to be the on event or the off event and a number of multicast messages transmitted within a predefined period of time is within a predefined threshold, the remote control device or the hub device may transmit the digital message as a multicast message. When the user interface event is determined to be an on event or an off event and the number of multicast messages transmitted within the predefined period of time exceeds the predefined threshold, the remote control device or the hub device may transmit the digital message as a unicast message. When the user interface event is determined to be an event other than the on event or the off event, such as a relative step change on a rotating remote control device, the remote control device or the hub device may transmit the digital message as a unicast message to the lighting device.

The multicast message may comprise a group identifier recognizable by the lighting device. The lighting device may be included in a group associated with the group identifier and have the group identifier stored thereon. The unicast message may include a unique identifier of the lighting device and be communicated individually to the lighting device. The unique identifier of the lighting device may be a serial number, a network identifier, or an IEEE address, for example.

The remote control device or the hub device may transmit the digital message as a unicast message when the user interface event is determined to be the on event or the off event and the number of multicast messages transmitted within the predefined period of time is outside of the predefined threshold. The lighting device may be included in a load control system having a plurality of lighting devices for controlling an amount of power provided to respective lighting loads. The remote control device or the hub device may transmit a respective unicast message to each lighting device of the plurality of lighting devices when the user interface event is determined to be an event other than the on event or the off event, and/or when the user interface event is determined to be an on event or the off event and the number of multicast messages transmitted within a defined period of time exceeds a threshold.

The remote control device or the hub device may calculate a delay between the transmission of each unicast message. The delay may be injected between unicast messages to help ensure that the communication link is idle prior to the device sending the next unicast message (e.g., help ensure that last message was propagated). The delay may be calculated as a function of the number of the lighting devices associated with the remote control device, or the number of associated lighting devices on a defined route for the unicast message within a mesh network. The remote control device or the hub device may determine the route in the mesh network for the unicast message to be transmitted to the lighting device. The delay may be calculated dynamically prior to the transmission of each unicast message.

DETAILED DESCRIPTION

Figure 1A:
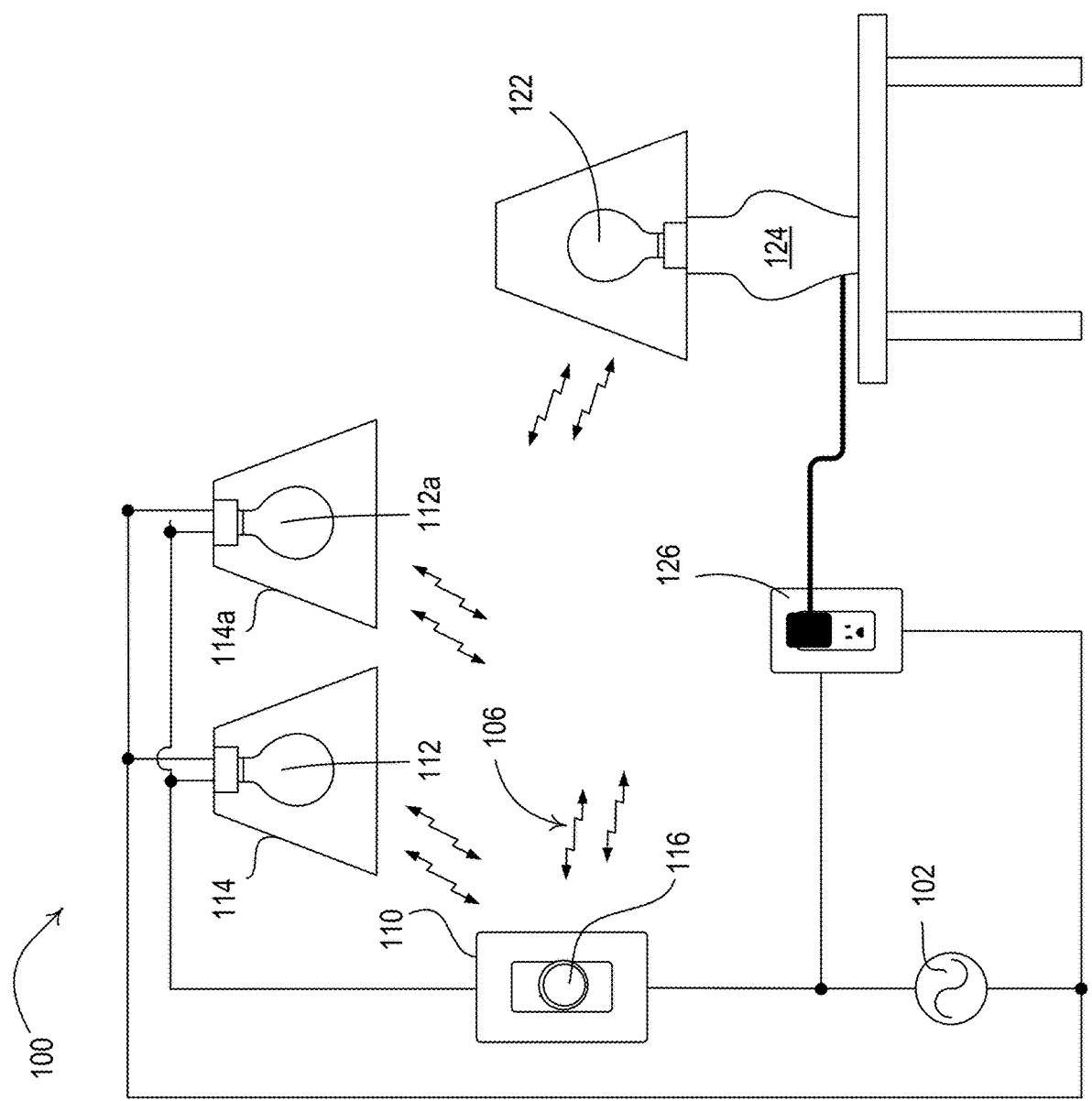
FIGS. 1A and 1B depict examples of a load control system that may implement one or more message types for communicating digital messages.
Figure 1B:
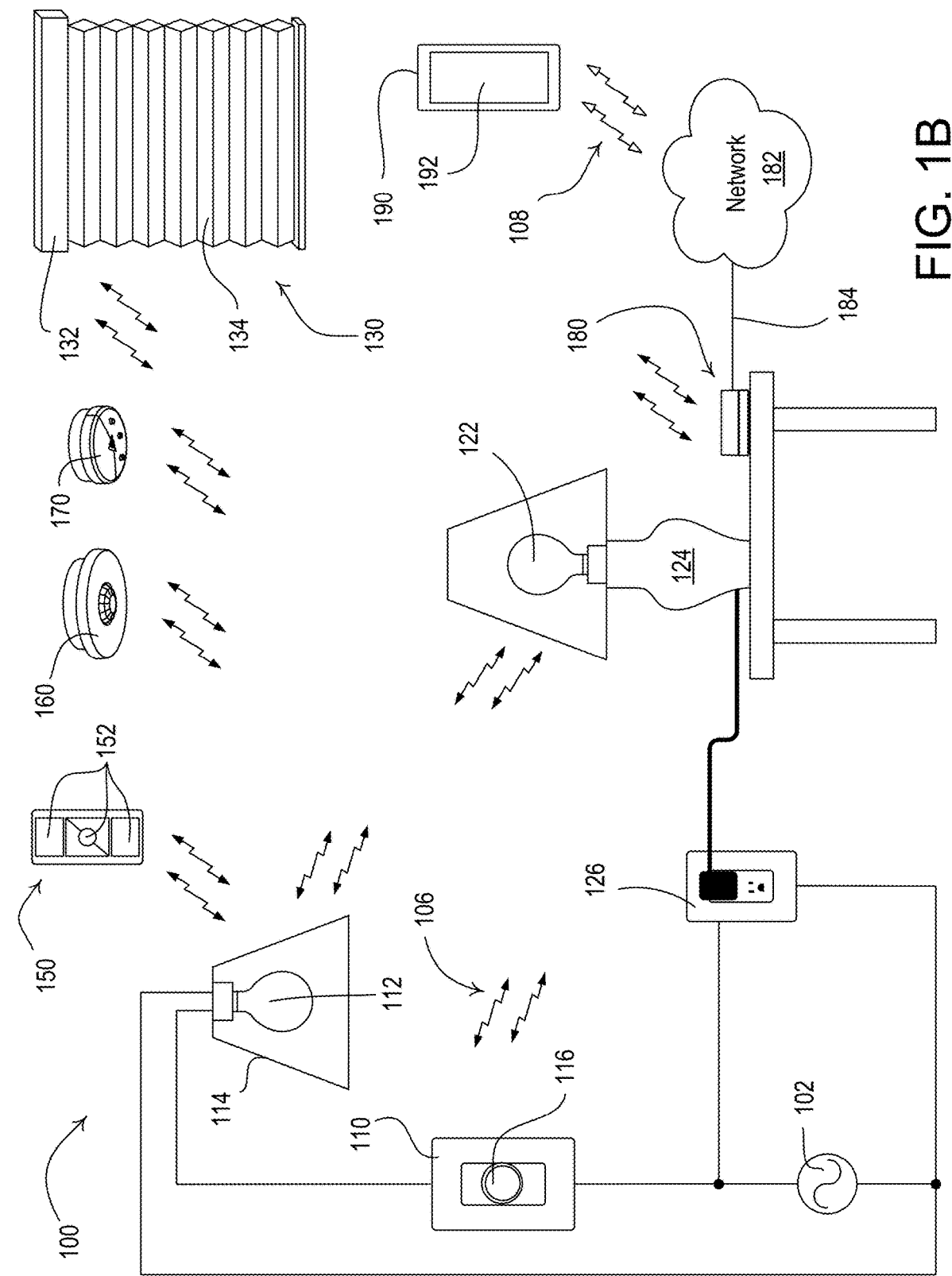

FIGS. 1A and 1B depict examples of a load control system 100 that may implement one or more message types for communicating digital messages. As shown in FIG. 1A, the load control system 100 may include various control devices, such as input devices and/or load control devices. The input device may send digital messages to the load control device to cause the load control device to control an amount of power provided from an AC power source 102 to an electric load in the load control system 100.

Load control devices may control the electrical loads within a room and/or a building. Each load control device may be capable of directly controlling the amount of power provided to an electrical load in response to communication from an input device. Example load control devices may include lighting devices 112, 112a and/or lighting device 122 (e.g., a load control device in light bulbs, ballasts, LED drivers, etc.). Load control devices may also, or alternatively, include an audio device for controlling a speaker, an HVAC device for controlling temperature, and/or other similar load control devices which control electrical loads in a system.

An input device may indirectly control the amount of power provided to an electrical load by transmitting digital messages to the load control device. The digital messages may include control instructions (e.g., load control instructions) or another indication that causes the load control device to determine load control instructions for controlling an electrical load. Example input devices may include remote control device 116. The input devices may include a wired or wireless device. Input devices may include remote control devices, which may be battery powered, solar powered, mechanically powered, etc., wired control devices, and/or plug-in control devices.

Control devices (e.g., input devices and/or load control devices) may communicate with each other and/or other devices via wired and/or wireless communications. The control devices may communicate using digital messages in a wireless signal. For example, the control devices may communicate via a radio frequency (RF) signal 106. The RF signal 106 may be communicated via an RF communication protocol (e.g., ZIGBEE®; near field communication (NFC); BLUETOOTH®; WI-FI®; a proprietary communication protocol, such as CLEAR CONNECT™, etc.). The digital messages may be transmitted as multicast messages and/or unicast messages via the RF signal 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

Lighting devices 112, 112a may be controlled by a wall-mounted load control device 110. Though lighting devices 112, 112a are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112, 112a. The wall-mounted load control device 110 may include a toggle actuator, which may be referred to as a switch, (not shown) for controlling the power from the AC power source 102. The lighting devices 112, 112a may be turned on and off by a switch (not shown) installed on the wall-mounted load control device 110. The lighting devices 112, 112a may be installed in respective ceiling mounted downlight fixtures 114, 114a or other lighting fixture mounted to another surface. The wall-mounted load control device 110 may be adapted to be wall-mounted in a standard electrical wallbox.

The lighting devices 112, 112a may be turned on or off, or the intensity level may be adjusted, in response to the remote control device 116 installed on the wall-mounted load control device 110. For example, the lighting devices 112, 112a may be turned on or off by turning the remote control device 116, which may act as a rotary knob, or pressing the remote control device 116, installed on the wall-mounted load control device 110. The lighting level of the lighting control devices 112, 112a may be increased or decreased by rotating the remote control device 116 in one direction or another, respectively.

The remote control device 116 may be a retrofit remote control device mounted over a toggle actuator (not shown) of the wall-mounted load control device 110. The remote control device 116 may be configured to maintain the toggle actuator (not shown) of the wall-mounted load control device 110 in the "on" position (e.g., by covering the switch when in the "on" position) to maintain the flow of power from the AC power source 102 to the lighting devices 112, 112*a*.

The remote control device 116 may transmit digital messages via the RF signals 106 to control the lighting devices 112, 112*a*, 122. The remote control device 116 may transmit digital messages including a move-to-level command that identifies a lighting level to which the lighting devices may change. The move-to-level command may include the amount of time over which the lighting level may be changed at the lighting devices. The move-to-level command may indicate an "on" event or an "off" event to turn the lighting devices 112, 112*a*, 122 on or off, respectively. For example, the "on" event may be indicated with a 100% lighting level, or another preset lighting level. The "off" event may be indicated with a 0% lighting level. The lighting level for the "on" event and/or the "off" event may also, or alternatively, be stored at the lighting devices 112, 112*a*, 122 and the lighting devices may change to the lighting level upon receiving an indication of the occurrence of the "on" event or "off" event at the remote control device 116. The digital messages may indicate an "on" event when the remote control device 116 is rotated a predefined distance or time in one direction. As an example, the remote control device 116 may transmit digital messages when the remote control device 116 is identified as being rotated for 100 milliseconds (ms). The digital messages may indicate an "off" event when the remote control device 116 is rotated a predefined distance or time in the opposite direction. The digital messages may indicate an "on" event or an "off" event when the remote control device 116 is pressed (e.g., when a button on the face of the remote control device is pressed or the remote control device 116 is pressed in).

The remote control device 116 may transmit digital messages configured to increase the lighting level of the lighting devices 112, 112*a*, 122 when the remote control device 116 is rotated in a direction (e.g., clockwise). The remote control device 116 may transmit digital messages configured to decrease the lighting level of the lighting devices 112, 112*a*, 122 when the remote control device 116 is rotated in the opposite direction (e.g., counterclockwise). The digital messages may include a move-with-rate command, which may cause the lighting devices 112, 112*a*, 122 to change their respective intensity level by a predefined amount. The move-with-rate command may include the amount of time over which the lighting level may be changed at the lighting devices. The move-with-rate command may cause the lighting devices 112, 112*a*, 122 to retain their proportional intensity levels, and/or difference in respective intensity levels. The remote control device 116 may send digital messages to increase or decrease the lighting level by a predefined amount when rotated a predefined distance or for a predefined time. The amount of the increase or decrease may be indicated in the digital messages or may be predefined at the lighting devices 112, 112*a*, 122.

Though examples are provided for controlling the lighting devices 112, 112*a*, 122 using RF signals 106 transmitted from the remote control device 116, the remote control device 116 may control other load control devices. For example, the remote control device 116 may transmit an "on" event or an "off" event to respectively turn on or off an audio device for controlling a speaker, an HVAC device for controlling temperature, and/or other similar load control devices which control electrical loads in a system. The move-to-level command or the move-with-rate command may be transmitted to control a volume level of the audio device, a temperature level of the HVAC device, or otherwise control a level at which an electrical load may be operated.

The digital messages transmitted via the RF signals 106 may be multicast messages. For example, the digital messages including the move-to-level command may be transmitted as multicast messages. The multicast messages may include a group identifier for controlling the lighting devices 112, 112*a*, 122 that are a part of the multicast group. The lighting devices 112, 112*a*, 122 may be a part of the multicast group when they are associated with the group identifier (e.g., by having the group identifier stored thereon) for recognizing multicast messages transmitted to the group. The lighting devices 112, 112*a*, 122 that are associated with the group identifier may recognize the multicast messages and control the corresponding lighting load according to the command in the multicast messages. The lighting devices 112, 112*a*, 122 may forward the multicast messages with the group identifier for identification and load control by other lighting devices associated with the group identifier.

The group may be formed at commissioning or configuration of the load control system 100. The remote control device 116 may generate the group identifier and send the group identifier to the lighting devices 112, 112*a*, 122 and/or a hub device 180 (e.g., shown in FIG. 1B) when the remote control device 116 is in an association mode (e.g., entered upon selection of one or more buttons). The devices that store the group identifier may be part of the group of devices that can respond to group messages.

The number of multicast messages that may be used to control the lighting devices 112, 112*a*, 122 may be limited within a defined period of time. For example, the lighting devices 112, 112*a*, 122 may respond to nine (9) multicast messages over a nine (9) second period of time for controlling the lighting devices 112, 112*a*, 122 before the lighting devices 112, 112*a*, 122 prevent receipt of multicast messages and/or control based on received multicast messages for a period of time (e.g., a number of seconds).

As the number of multicast messages may be limited within a defined period of time, the unicast messages may also, or alternatively, be transmitted via the RF signals 106. For example, the digital messages including the move-with-rate command or the move-to-level command may be transmitted as unicast messages. Unicast messages may be sent from the remote control device 116 directly or via hops to each of the lighting devices 112, 112*a*, 122. The remote control device 116 may individually send a unicast message to each of the lighting devices 112, 112*a*, 122 with which the remote control device 116 is associated for performing load control. The remote control device 116 may have the unique identifier of each of the lighting devices 112, 112*a*, 122 with which it is associated stored in memory. The remote control device 116 may generate a separate unicast message for each lighting device 112, 112*a*, 122 and address the unicast messages to the lighting devices 112, 112*a*, 122 independently. The unicast messages may also include the unique identifier of the remote control device 116. The lighting devices 112, 112*a*, 122 may identify the unicast messages communicated to them by identifying their own unique identifier and/or a corresponding identifier of the remote that are stored in an association dataset. The lighting devices 112, 112*a*, 122 may operate according to the instructions (e.g., load control instructions) in the digital messages comprising their own unique identifier and/or the unique identifier of an associated device, such as the remote control device 116.

The multicast messages may be communicated more efficiently from the remote control device 116, as a single message may be transmitted to multiple lighting devices, such as lighting devices 112, 112a, 122, at once. The multicast messages may be more reliable, as the multicast messages may be repeated by a receiving device, such that devices that fail to receive the message due to interference or signal strength may receive the multicast message upon the message being repeated. The load control instructions in the multicast messages may also be received and implemented by multiple lighting devices, such as lighting devices 112, 112a, 122, at the same time, or at nearly the same time with a minor delay due to differences in latency, as a single message is being received at a group of devices within the same wireless range. The difference in latency may be overcome by determining the latency at each of the lighting devices and compensating for the difference in latency at each lighting device by delaying the implementation of the load control instructions by the difference in latency. The load control instructions in the unicast messages may be received and implemented by multiple lighting devices 112, 112a, 122 at different times, which may be caused by the difference in latency between the devices and/or the time to process and transmit each message, as a different message is being transmitted to each device in a wireless range. The number of unicast messages transmitted within a predefined period of time may be unlimited.

The remote control device 116 may determine a message transmission configuration to efficiently transmit messages to the respective lighting devices when the remote control device detects a user interface event on a user interface. The message transmission configuration may include one or a plurality of unicast and/or multicast messages. A hybrid form of communication using multicast and unicast messages may be implemented at the remote control device 116, and/or other transmitting devices in the load control system 100, to prevent exceeding the predefined number of multicast messages to be transmitted within a predefined period of time, and allow for more efficient communication of digital messages, while limiting distractions to the user due to observable delay in implementation of load control instructions at different devices.

The multicast messages may be reserved for digital messages that may change the lighting intensity level more drastically. The multicast messages may be reserved for digital messages that include a move-to-level command, as the delay between lighting devices changing an intensity level may be more noticeable to occupants of a space when the change in the intensity level at the lighting devices is greater. For example, the multicast messages may be generated for events such as on, off, toggle, move to level, move, stop, step, and/or recall scenes, as implementing the events may be more noticeable to occupants of a space. The on command may be interpreted by the lighting devices to turn the lighting load on. The off command may be interpreted by the lighting devices to turn the lighting load off. When a lighting load is already on or off and the lighting device receives the on or off command, respectively, the lighting device may maintain the indicated status. The toggle command may cause each of the lighting devices to switch the status of the lighting load from on to off, or vice versa. The move-to-level commands may indicate a lighting level to which the lighting load may be moved. A lighting device may move a lighting load by increasing or decreasing the intensity in an indicated direction upon receiving a move command until a stop command is received. The stop command may be transmitted to cause the lighting device to stop moving the lighting intensity level of the lighting device. A step command may indicate a preset intensity which the lighting load may be increased or decreased. The preset intensity may be stored locally at the lighting device or may be indicated in the step command. The step command, the move command, and/or the move-to-level command may also be on/off commands that cause the lighting load to turn on when the lighting load is off, or to turn off when the lighting load is on. A recall scenes command may be sent via multicast messages for preset events, where the lighting devices recall a specific state from memory upon receiving a message with a recall scene command. In another example, the on command or toggle command may be used to turn the lighting load on, and/or the off command or the toggle command may be used to turn the lighting load off.

One example of defined events may be implemented using a ZIGBEE® protocol. For example, the multicast messages generated for a ZIGBEE® protocol may be generated for events such as on, off, toggle, move to level, move to level with on/off, move, move with on/off, stop, step, and/or step with on/off.

The unicast messages may be used to transmit load control instructions indicating a change to the lighting intensity of the lighting devices 112, 112a, 122, as the greater delay of implementation of the load control instructions at each of the lighting devices 112, 112a, 122 may be less noticeable to the occupants when the change in lighting intensity is less. The unicast messages may also limit the network traffic by not causing the receiving device to repeat the message. A combination of multicast and unicast messages may be used to optimally change the lighting intensity to minimize the latency effects of the unicast messages while remaining under the predefined limit of the multicast messages.

The multicast messages may be used so long as the number of multicast messages transmitted and/or received within a predefined period of time does not exceed a predefined limit. For example, in a ZIGBEE® communication system, the remote control device 116 may configure digital messages as multicast messages to transmit "on" or "off" commands, so long as the remote control device 116 does not transmit and/or the lighting devices 112, 112a, 122 do not receive more than nine (9) multicast message over a nine (9) second period of time. If the number of multicast messages transmitted by the remote control device 116 and/or received by the lighting devices 112, 112a, 122 exceeds the predefined number, the remote control device 116 may configure the move-to-level commands, such as "on" or "off" commands, as unicast messages (e.g., until the predefined period of time has elapsed).

The remote control device 116 and/or the lighting devices 112, 112a, 122 may keep track of the number of multicast messages sent within a predefined period of time. The remote control device 116 may automatically configure the digital messages as multicast messages and unicast messages according to the number of multicast messages transmitted within the predefined period of time. The remote control device 116 may also, or alternatively, configure messages as multicast messages and wait for a negative acknowledgement ("NACK") or other indication that the last multicast message is above the threshold number of multicast messages allowed within the predefined period of time. If the remote control device 116 determines that the number of multicast messages is approaching the predefined limit, the remote control device 116 may adaptively switch to using unicast messages exclusively or as needed, or may alternate between unicast and multicast messages, or employ similar message configurations to ensure that the multicast messages are sufficiently spaced in time such that the lighting devices 112, 112a, 122 are prevented from exceeding the predefined limit (e.g., until the predefined period of time has elapsed).

The remote control device 116 may transmit unicast messages that include move-with-rate commands to increase or decrease the lighting intensity level of the lighting devices 112, 112a, 122 in predefined increments as the user turns the remote control device 116 a predefined distance or time in one direction or another. The remote control device 116 may independently transmit a unicast message to each lighting device 112, 112a, 122 in order and may keep transmitting unicast messages to each lighting device 112, 112a, 122 as the user continues to turn the remote control device 116. For example, the remote control device 116 may identify a rotation of a predefined distance or for a predefined time and send a unicast message to instruct the lighting device 112 to increase by ten percent (10%), send a unicast message to instruct the lighting device 112a to increase by ten percent (10%), and send a unicast message to instruct the lighting device 122 to increase by ten percent (10%). The remote control device 116 may identify a continued rotation of a predefined distance or time and send respective unicast messages to instruct the lighting devices 112, 112a, 122 to increase by ten percent (10%) again.

The remote control device 116 may also, or alternatively, send unicast messages for a move-to-level command (e.g., on or off command) to turn on/off the lighting devices 112, 112a, 122. The remote control device 116 may independently transmit a unicast message to each lighting device 112, 112a, 122 in order when an on event or an off event are detected. For example, the remote control device 116 may identify a rotation or actuation and send a unicast message to instruct the lighting device 112 to turn on/off, send a unicast message to instruct the lighting device 112a to turn on/off, and send a unicast message to instruct the lighting device 122 to turn on/off. The remote control device 116 may operate by sending a move-with-rate command after turning on. For example, the remote control device 116 may identify a rotation of a predefined distance or time after turning on and send respective unicast messages to instruct the lighting devices 112, 112a, 122 to increase/decrease by a predefined intensity (e.g., ten percent (10%)).

Embodiments described herein are not limited to remote control devices, but other input devices may also be used in the same, or similar, manner. For example, embodiments may include wired control devices and/or plug-in control devices that communicate unicast and/or multicast messages as described herein. Additionally, although examples are provided for controlling lighting devices using multicast and/or unicast messages, similar message formats may be used to control other types of load control devices, such as an audio device for controlling a speaker, an HVAC device for controlling temperature, and/or other similar load control devices which control electrical loads in a system, for example. The multicast and/or unicast messages may operate as described herein to change the volume level of an audio device, a temperature of an HVAC device, and/or levels of other electrical loads in a system. For example, the multicast messages may be generated for events such as on, off, toggle, move to level, move, stop, step, and/or recall scenes for controlling the volume level of an audio device, a temperature of an HVAC device, and/or levels of other electrical loads in a system.

FIG. 1B shows the example load control system 100 having other devices. For example, the load control system 100 may include other control devices, such as input devices and/or load control devices. The load control devices may be capable of controlling the amount of power provided to a respective electrical load based on digital messages received from the input devices. The digital messages may include load control instructions or another indication that causes the load control device to determine load control instructions for controlling an electrical load.

Examples of load control devices may include a motorized window treatment 130 and/or the lighting devices 112, 122, though other load control devices may be implemented. The input devices may include a remote control device 150, an occupancy sensor 160, a daylight sensor 170, and/or a network device 190, though other input devices may be implemented. The input devices may perform communications in a configuration similar to the remote control device 116 as described herein. The load control devices may perform communications in a configuration similar to the lighting devices 112, 122 as described herein.

The load control devices may receive digital messages via wireless signals, e.g., radio-frequency (RF) signals 106 (e.g., ZIGBEE®; NFC; BLUETOOTH®; WI-FI®; or a proprietary communication channel, such as CLEAR CONNECT™, etc.). The wireless signals may be transmitted by the input devices. In response to the received digital messages, the respective lighting devices 112, 122 may be turned on and off, and/or the intensities of the respective lighting devices 112, 122 may be increased or decreased. In response to the received digital messages, the motorized window treatment 130 may increase or decrease a level of a covering material 134.

The remote control device 150 may include one or more actuators 152 (e.g., one or more of an on button, an off button, a raise button, a lower button, or a preset button). The remote control device 150 may transmit RF signals 106 in response to actuations of one or more of the actuators 152. The remote control device 150 may be handheld. The remote control device 150 may be mounted vertically to a wall, or supported on a pedestal to be mounted on a tabletop. The remote control device 150 may be attached to the wall or detached from the wall. The remote control device 150 may be battery powered. Examples of remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS; U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL WITH LABEL SERVING AS ANTENNA ELEMENT; U.S. Patent Application Publication No. 2014/0132475, published May 15, 2014, entitled WIRELESS LOAD CONTROL DEVICE; and U.S. Patent Application Publication No. 2012/0286940, published Nov. 15, 2012, entitled CONTROL DEVICE HAVING A NIGHTLIGHT, the entire disclosures of which are hereby incorporated by reference.

The occupancy sensor 160 may be configured to detect occupancy and vacancy conditions in the space in which the load control system 100 is installed. The occupancy sensor 160 may transmit digital messages to load control devices via the RF communication signals 106 in response to detecting the occupancy or vacancy conditions. The occupancy sensor 160 may operate as a vacancy sensor, such that digital messages are transmitted in response to detecting a vacancy condition (e.g., digital messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 170 may be configured to measure a total light intensity in the space in which the load control system 100 is installed. The daylight sensor 170 may transmit digital messages including the measured light intensity via the RF communication signals 106 for controlling load control devices in response to the measured light intensity. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade systems, or other suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit of the motorized window treatment 130. The motor drive unit 132 may respond to digital messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. Patent Application Publication No. 2014/0231032, published Aug. 21, 2014, entitled BATTERY-POWERED ROLLER SHADE SYSTEM, the entire disclosures of which are hereby incorporated by reference Digital messages transmitted by the input devices may include a command and/or identifying information, such as a serial number (e.g., a unique identifier) associated with the transmitting input device. Each of the input devices may be assigned to load control devices, such as the lighting devices 112, 122 and/or the motorized window treatment 130, during a configuration procedure of the load control system 100, such that the lighting devices 112, 122 and/or the motorized window treatment 130 may be responsive to digital messages transmitted by the input devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The load control system 100 may include a hub device 180 configured to enable communication with a network 182, e.g., a wireless or wired local area network (LAN). The hub device 180 may be connected to a router via a wired digital communication link 184 (e.g., an Ethernet communication link). The router may allow for communication with the network 182, e.g., for access to the Internet. The hub device 180 may be wirelessly connected to the network 182, e.g., using wireless technology, such as Wi-Fi technology, cellular technology, etc. The hub device 180 may be configured to transmit communication signals (e.g., RF signals 106) to the lighting devices 112, 122 and/or the motorized window treatment 130 for controlling the devices in response to digital messages received from external devices via the network 182. The hub device 180 may communicate via one or more types of RF communication signals (e.g., ZIGBEE®; NFC; BLUETOOTH®; WI-FI®; cellular; a proprietary communication channel, such as CLEAR CONNECT™, etc.). The hub device 180 may be configured to transmit and/or receive RF signals 106 (e.g., using ZIGBEE®; NFC; BLUETOOTH®; or a proprietary communication channel, such as CLEAR CONNECT™, etc.). The hub device 180 may be configured to transmit digital messages via the network 182 for providing data (e.g., status information) to external devices (e.g., using WI-FI®, cellular, etc.).

The RF signals 106 may be transmitted via one or more protocols. For example, the remote control device 116 and the remote control device 150 may communicate digital messages to lighting devices 112, 122 via another protocol (e.g., ZIGBEE®, BLUETOOTH®, etc.) than other devices (e.g., occupancy sensor 160, daylight sensor 170, motorized window treatment 130) may communicate (e.g., a proprietary communication channel, such as CLEAR CONNECT™, etc.). The hub device 180 may format digital communications using the appropriate protocol.

The hub device 180 may operate as a central controller for the load control system 100, and/or relay digital messages between the control devices (e.g., lighting devices, motorized window treatments, etc.) of the load control system and the network 182. The hub device 180 may receive digital messages from an input device and configure the digital message for communication to a load control device. For example, the hub device may configure multicast messages and/or unicast messages for transmission as described herein. The hub device 180 may be on-site at the load control system 100 or at a remote location. Though the hub device 180 is shown as a single device, the load control system 100 may include multiple hubs and/or the functionality thereof may be distributed across multiple devices.

The load control system 100 may include a network device 190, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® handheld computing device), a Wi-Fi or wireless-communication-capable television, or any other suitable network communication or Internet-Protocol-enabled device. The network device 190 may be operable to transmit digital messages in one or more Internet Protocol packets to the hub device 180 via RF signals 108 either directly or via the network 182. For example, the network device 190 may transmit the RF signals 108 to the hub device 180 via a Wi-Fi communication link, a Wi-MAX communications link, a Bluetooth® communications link, a near field communication (NFC) link, a cellular communications link, a television white space (TVWS) communication link, or any combination thereof. The RF signals 108 may be communicated using a different protocol and/or wireless band than the RF signals 106. For example, the RF signals 108 may be configured for Wi-Fi communication or cellular communication, while RF signals 106 may be configured for ZIGBEE® or a proprietary communication channel, such as CLEAR CONNECT™. In another example, the RF signals 108 and the RF signals 106 may be the same. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit digital messages to the load control devices and/or the hub device 180 through the wireless communications described herein.

The operation of the load control system 100 may be programmed and configured using the hub device 180 and/or network device 190. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

Figure 2:
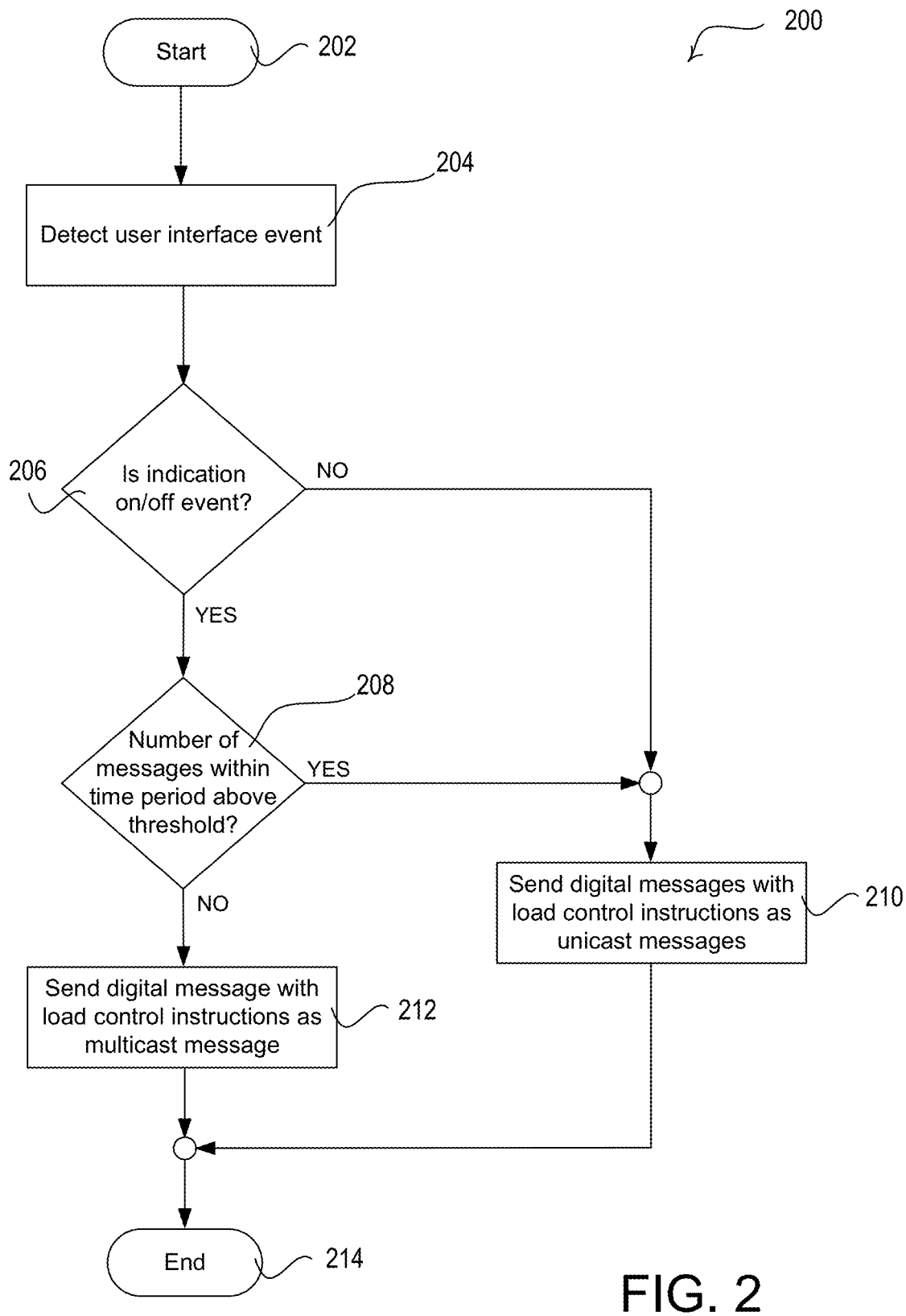
FIG. 2 is a flowchart depicting an example method for configuring digital messages for transmission in a load control system.

FIG. 2 is a flowchart depicting an example method 200 for configuring digital messages for transmission in a load control system. As shown in FIG. 2, the method 200 may begin at 202. At 204, a control device, such as a remote control device, may detect a user interface event on a user interface. The user interface event may be a button press or a rotation of a remote control device a predefined distance or for a predefined time, for example. At 206, it may be determined whether the user interface event is an "on" event or an "off" event or scene control event. The determination at 206 may also comprise a determination as to whether the user interface event is for transmission of another move-to-level command, such as a move-to-level command that would cause an increase or decrease greater than a predefined threshold, for example.

If the user interface event is an on/off event or an indication for transmission of another move-to-level command, such as a move-to-level command that would cause an increase or decrease in intensity greater than a predefined threshold intensity level, a determination may be made at 208 to identify whether the number of multicast messages that have been transmitted or received within a predefined period is above a predefined threshold at 208. The threshold number of messages and/or the predefined period of time may be defined according to a ZIGBEE® standard (e.g., nine multicast messages within a nine second period of time). The determination at 208 may be made at the input device configuring the messages for transmission, such as a remote control device, and/or the load control device receiving the digital messages, such as the lighting devices, for example. If the threshold number of multicast messages transmitted or received within the time period is below the predefined threshold, the control device may send the digital message with the load control instructions as a multicast message at 212. The method 200 may end at 214.

If the indication is determined to be an indication to increase/decrease the lighting level of the lighting devices at 206 (e.g., when the load is on), or the indication is an on/off event or other move-to-level command above a defined threshold at 206 and the number of multicast messages is within a time period is above the predefined threshold at 208, the control device may send digital message with the load control instructions as unicast messages to each of the associated devices at 210. The indication to increase/decrease the level of the lighting devices may be below a predefined threshold intensity level (e.g., in a move-with-rate command). The method 200 may end at 214.

The method 200 may similarly be performed for configuring messages for controlling other load control devices. For example, a determination may be made at 206 to determine whether the indication is to move a motorized window treatment to a fully-open/fully-closed position, or a position greater or less than a predefined threshold. The control device may transmit the digital message to the motorized window treatment as a multicast message at 212 if the number of multicast messages transmitted or received within a time period is determined to be below the predefined threshold at 208.

Though the method 200, or portions thereof, may be described as being performed by a control device, the method 200, or portions thereof, may be performed by a hub device when the digital messages are sent to control devices via the hub device. Additionally, though the method 200 may be described for controlling lighting devices or motorized window treatments, the method 200 may similarly be implemented to control other types of load control devices, such as an audio device for controlling a speaker, an HVAC device for controlling temperature, and/or other similar load control devices which control electrical loads in a system.

Figure 3:
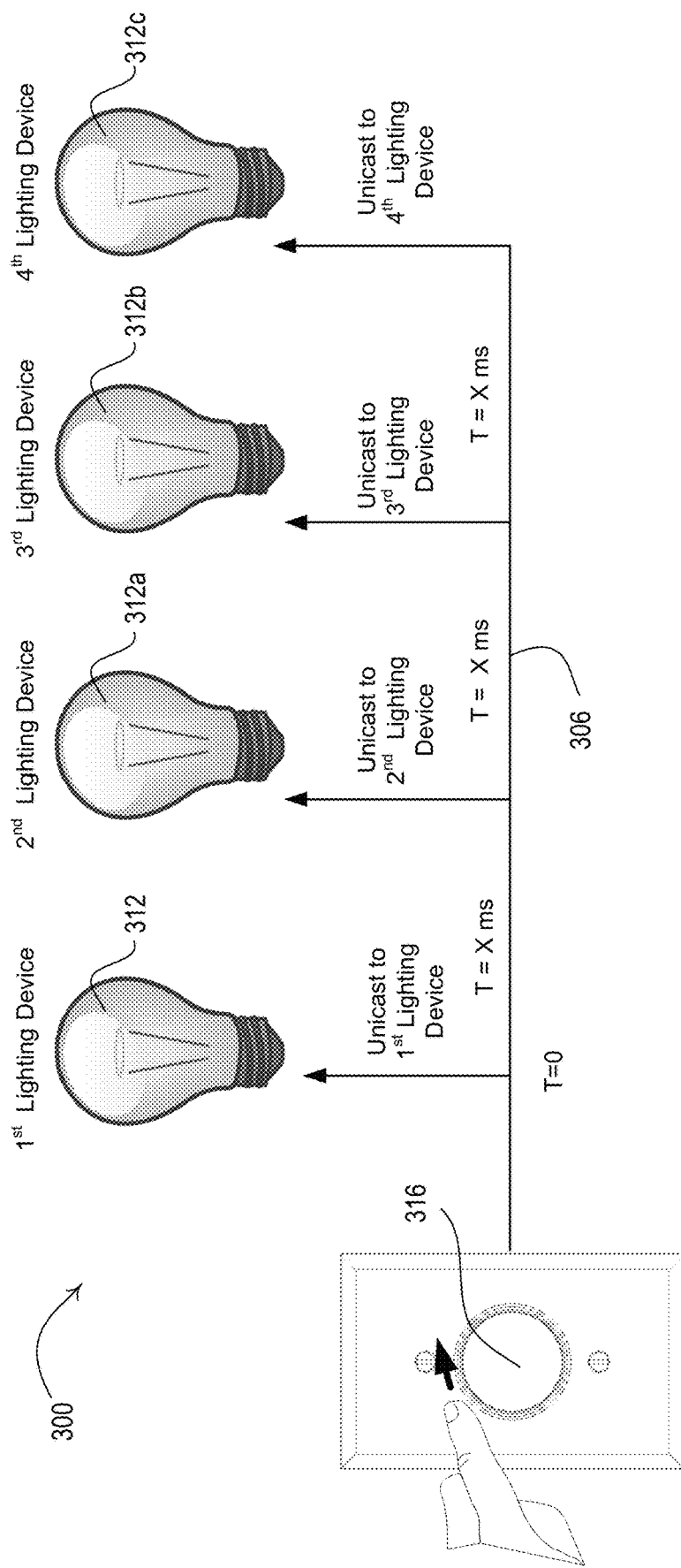
FIG. 3 shows an example load control system that indicates a timing configuration for transmitting unicast messages in a load control system.

FIG. 3 shows an example load control system 300 that indicates a timing configuration for transmitting unicast messages. As shown in FIG. 3, the remote control device 316 may transmit a unicast message to each of the lighting devices 312, 312a, 312b, 312c (e.g., light bulbs) on a link 306. The lighting devices 312, 312a, 312b, 312c may communicate with one another in a mesh network. The route for the unicast messages may be determined by the remote control device 316, a hub device, or one or more of the lighting devices 312, 312a, 312b, 312c. The route may be determined by a parent device. For example, the remote control device 316 may transmit each message to a parent device, such as lighting device 312, which may forward the unicast message on in a determined route to the addressed lighting device. The parent device, or other devices determining the route of digital messages, may dynamically determine the route of the digital message based on a proximity of the parent device to neighboring devices. The proximity may be a geographic proximity, or an estimated proximity based on a measurement of received signal strength (e.g., RSSI) for messages transmitted between devices.

The unicast messages may be transmitted to the furthest lighting device 312, 312a, 312b, 312c (e.g., light bulbs) on the link 306 first and continue to be transmitted to the further devices prior to closer devices to allow for processing of messages while the messages are traveling between devices, or to allow the closer devices to forward messages on the route and then begin processing their own messages upon receipt. The processing of messages may be occurring at multiple devices in this way and allow for more efficient communication of unicast messages.

The link 306 may include a wired or a wireless communication link. The link 306 may include a power link. The unicast message may be configured at the remote control device 316 after detecting a user interface event. The user interface event may be a rotation of a defined amount, such as a relative step change on the remote control device 316.

Per relative step change on the remote control device 316, the remote control device 316 may send out a unicast message with a move-with-rate command, or move-to-level command (e.g., on/off command), to each of the associated lighting devices 312, 312a, 312b, 312c on the link 306, using a unicast addressing scheme. The unicast messages may include the unique identifier of the lighting device 312, 312a, 312b, 312c to which the message is addressed.

The remote control device 316 may inject a delay (e.g., X millisecond (ms) delay) between sending a unicast message to each lighting device 312, 312a, 312b, 312c. When the unicast messages are communicated via a hub device, the hub device may inject the delay. This delay may be injected to prevent the remote control device 316 from overflowing its own transmit buffer, which may cause message drop outs/failures and playback. This delay may be injected in an attempt to ensure there is enough time for the parent device to send out the message to a destination device in case of retries and/or repeating messages in a mesh network. Transmission of messages may be retried and/or repeated when the device does not receive an acknowledgement, or receives a negative acknowledgement. The delay may be thirty-seven milliseconds (ms) or less, as an example.

The rate at which the remote control device 316 sends the unicast messages and the amount of change in the rotation may be defined based on the number of lighting devices in the system 300 with which the remote control device 316 and/or a hub device is associated for communication. The rate the unicast messages are transmitted from the remote control device 316 and/or the hub device may be a function of the number of lighting devices in the system 300.

The delay between the unicast messages may cause the unicast message to be transmitted at a rate equal to the average time to transmit a message between devices (e.g., 10 ms) with an additional buffer delay. The average time to transmit a message may be the average time to transmit a message from the remote control device 316 to another device in the system, such as a parent device or another destination device. The average time to transmit a message may be different based on the device to which the messages are being transmitted. The average time to transmit a message may take into account multiple transmissions. For example, the average time to transmit a message may consider the time to transmit a message to a parent device (e.g., 5 ms) and the time to transmit from the parent to a destination (e.g., 5 ms). The additional buffer delay may be dynamically chosen by the remote control device 316 based on the number of lighting device 312, 312a, 312b, 312c associated with the remote control device 316. The additional buffer delay may be injected between unicast messages to help ensure that the communication link is idle prior to sending the next unicast message (e.g., help ensure that last message was propagated). The greater the link traffic on the link 306, the greater the delay may be (e.g., to avoid message collisions). The additional buffer delay may be a number between 5 ms and 10 ms, for example, with a total delay period (e.g., X ms delay) between messages being a minimum of 10 ms and a maximum of 20 ms. The total time between sending out a level change to the lighting devices 312, 312a, 312b, 312c may be 200 ms or less (e.g., for ten lighting devices).

The remote control device 316 may query the lighting devices 312, 312a, 312b, 312c to detect the worst case hop for transmissions in the mesh network. The hub device may also, or alternatively, query the lighting devices 312, 312a, 312b, 312c to detect the worst case hop for transmissions in the mesh network. The worst case hop may be factored in to the determination of the delay during unicast transmission. If the remote control device 316 or the hub device determines the route for a message, the remote control device 316 or the hub device may tell the lighting devices (e.g., the parent lighting device) which devices to prioritize. The closer bulbs identified based on the query may be given a higher priority and order in the route.

The remote control device 316 may transmit a unicast message to each lighting device 312, 312a, 312b, 312c. The remote control device 316 may transmit a unicast message to the lighting device 312 at time T=0. The remote control device 316 may wait a period of time that includes the calculated delay based on the number of associated lighting devices and may transmit the next unicast message to the lighting device 312a. The remote control device 316 may continue to wait the period of time that includes the calculated delay between transmitting each unicast message to the associated lighting devices 312b, 312c.

If the remote control device 316 identifies a continued rotation in one direction or another, the remote control device 316 may begin transmitting unicast messages again in a similar sequence (e.g., with similar delay between messages) to continue changing the lighting level if the remote control device 316 continues identifying rotations. The delay between unicast messages may allow each lighting device 312, 312a, 312b, 312c to reach its lighting level prior to receiving the next unicast message. The rate of change or time period of change that is sent with the command is selected such that the lighting device reaches the target lighting level before or at the same time as receiving the next unicast message. The delay between unicast messages may allow the parent device time for processing messages prior to receiving the next message. The delay between unicast messages may allow receiving devices time to repeat messages, send an acknowledgement ("ACK") or a NACK to the transmitting device, and/or perform route discovery for the message transmission in the mesh network. The delay between unicast messages may allow the transmitting device time to retransmit in case of a NACK. The remote control device 316 may enter a sleep mode during the time between transmissions.

When the remote control device 316 or a hub device reaches the end of a unicast transmission event (e.g., when a stop in the rotation of a knob to adjust intensity is detected) in unicast messaging (e.g., for a period of time), the remote control device 316 or a hub device may send a multicast message indicating to each lighting device 312, 312a, 312b, 312c the intensity level at which the devices should be operating, assuming that each of the lighting devices 312, 312a, 312b, 312c are being controlled to the same level. The lighting devices 312, 312a, 312b, 312c may confirm that they are at the indicated intensity and/or adjust to the lighting level indicated in the multicast message.

The lighting devices 312, 312a, 312b, 312c may be configured to report status changes (e.g., intensity level changes, color changes, etc.) to the hub device. The hub device may be configured to monitor commands from the control devices and status changes from the lighting devices 312, 312a, 312b, 312c. The hub device may determine whether any of the lighting devices 312, 312a, 312b, 312c have missed command messages from one or more of the control devices. The hub device may store the status (e.g., intensity level, color, etc.) at which each of the lighting devices 312, 312a, 312b, 312c should be operating based on the commands from the control devices and compare the stored status with the status indicated in the feedback messages. If the hub device determines that one or more of the lighting devices 312, 312a, 312b, 312c have missed a command message from one or more of the control devices, the hub may resend the command message to the lighting devices 312, 312a, 312b, 312c which missed the original command message (e.g., as a unicast message), or the hub device may resend the command message to each of the lighting devices 312, 312a, 312b, 312c associated with the one or more control devices (e.g., as a unicast message or a multicast message).

Though the load control system 300, or portions thereof, may be described for controlling and/or reporting the status of lighting devices, such as lighting device 312, 312a, 312b, 312c, the system 300 may include other types of load control devices that may be similarly controlled and/or monitored in the system 300, such as audio devices for controlling speakers, HVAC devices for controlling temperature, and/or other similar load control devices which control electrical loads in a system.

Figure 4:
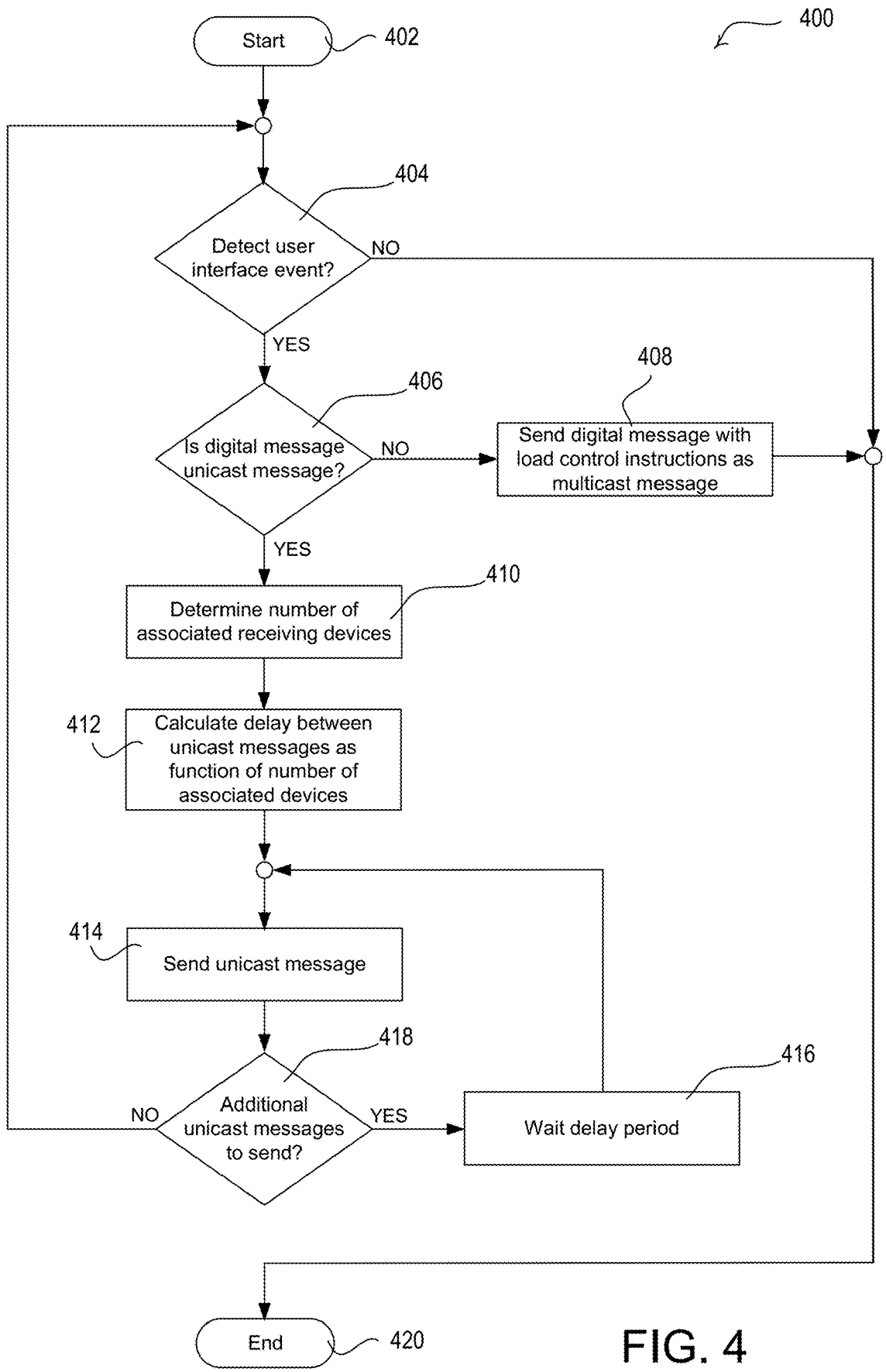
FIG. 4 is a flowchart depicting an example method for configuring digital messages for transmission in a load control system.

FIG. 4 is a flowchart depicting an example method 400 for configuring digital messages for transmission in a load control system. The method 400 may be performed at one or more devices in the load control system. For example, the method 400, or portions thereof, may be performed at a remote control device, a hub device, and/or another computing device.

As shown in FIG. 4, the method 400 may begin at 402. At 404, a control device, such as a remote control device, may determine whether a user interface event has been detected on a user interface. The user interface event may be a rotation of a defined amount or for a defined amount of time, such as a relative step change on the remote control device. If a user interface event is not detected at 404, the method 400 may end at 420.

If a user interface event is detected at 404, a determination may be made as to whether a digital message triggered by the user interface event is a unicast message or a multicast message, as described herein. If the digital message is to be transmitted as a multicast message, the digital message may be sent, at 408, as a multicast message including the load control instructions. The method 400 may end at 420.

If the digital message is to be transmitted as a unicast message, the number of associated receiving devices may be determined, at 410. The number of associated receiving devices may be the number of control devices associated with the transmitting device, and/or the number of receiving devices on the determined route to the receiving device in the mesh network. The delay between transmissions of each unicast message may be calculated, at 412. The delay may be calculated as a function of the number of associated receiving devices determined at 410. Though the delay may be shown as being calculated at 410, the delay may also, or alternatively, be calculated at other times. For example, the delay may be calculated each time a remote control device receives an input and/or the delay may be calculated and set when an adjustment is made to the number of lighting devices associated with the remote control device (e.g., lighting device is associated or unassociated with the remote).

At 414, a unicast message may be sent to a receiving device. The unicast message may be addressed to the receiving device and may be forwarded along a determined route in a mesh network. A determination may be made, at 418, as to whether there are additional unicast messages to be sent based on the detected user event at 404. Additional unicast messages may be sent if additional associated devices are yet to receive a unicast message based on the user event detected at 404. If additional unicast messages are to be sent at 418, the device may wait the delay period at 416 prior to sending another unicast message at 414. The device may enter a sleep mode during the delay period 416. If no additional unicast messages are to be sent, the method 400 may return to 404 to determine whether another user event has been detected, such as a continued rotation of the remote control device. If another user event is not detected at 404, the method may end at 420.

Figure 5:
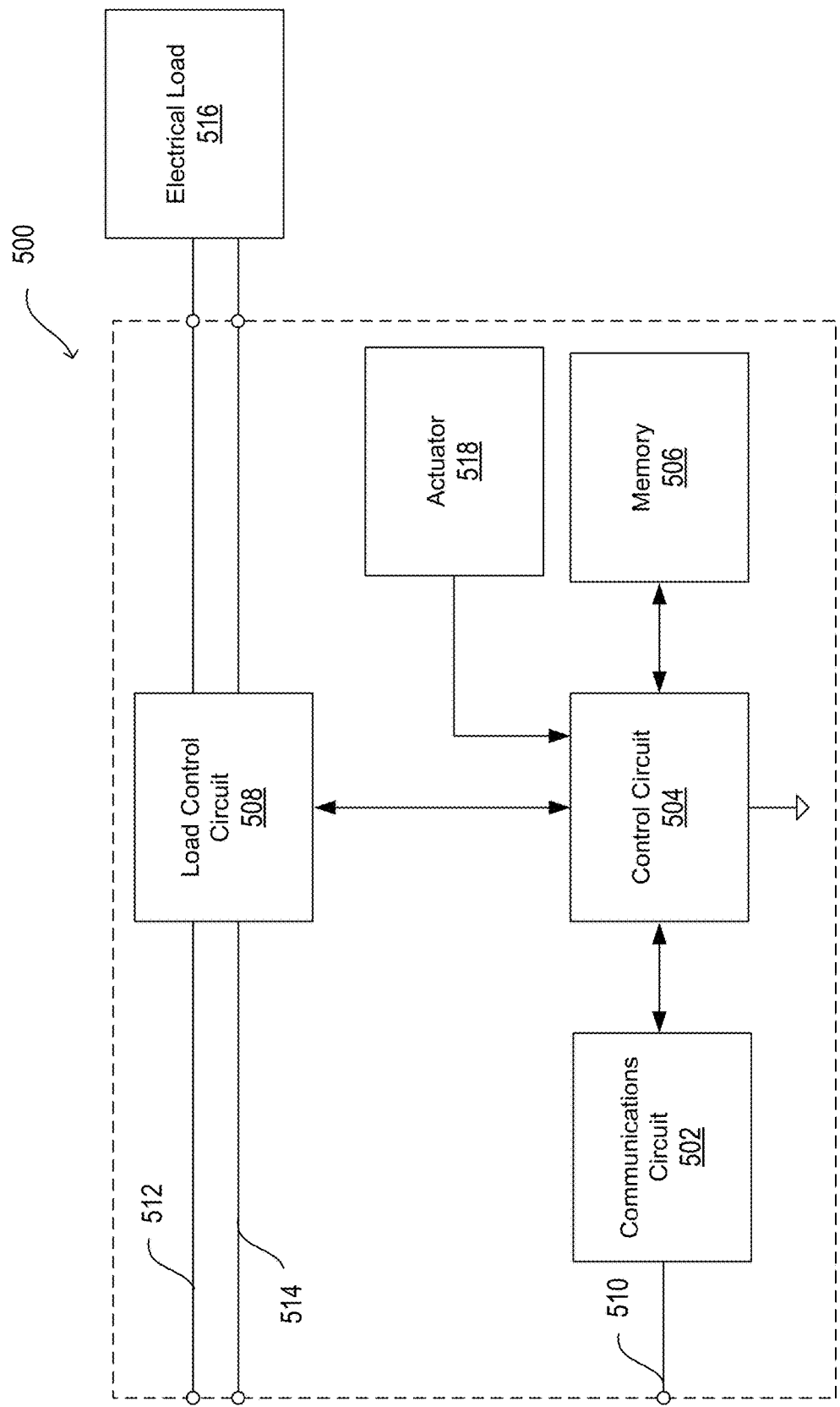
FIG. 5 is a block diagram of an example load control device.

FIG. 5 is a block diagram illustrating an example load control device, e.g., a load control device 500, as described herein. The load control device 500 may be a dimmer switch, an electronic switch, a lighting device (e.g., a light bulb, an electronic ballast for lamps, an LED driver for LED light sources, etc.), an audio device for controlling a speaker, an AC plug-in load control device, a temperature control device (e.g., a thermostat) or other HVAC device for controlling temperature, a motor drive unit for a motorized window treatment, or other load control device.

The load control device 500 may include a communications circuit 502. The communications circuit 502 may include a receiver, an RF transceiver, or other communications module capable of performing wired and/or wireless communications via communications link 510. The communications circuit 502 may be in communication with control circuit 504. The control circuit 504 may include one or more general purpose processors, special purpose processors, conventional processors, digital signal processors (DSPs), microprocessors, integrated circuits, a programmable logic device (PLD), application specific integrated circuits (ASICs), or the like. The control circuit 504 may perform signal coding, data processing, power control, input/output processing, or any other functionality that enables the load control device 500 to perform as described herein.

The control circuit 504 may store information in and/or retrieve information from the memory 506. For example, the memory 506 may maintain a registry of associated control devices and/or control configuration instructions. The memory 506 may include a non-removable memory and/or a removable memory.

The load control circuit 508 may receive instructions from the control circuit 504 and may control the electrical load 516 based on the received instructions. The load control circuit 508 may send status feedback to the control circuit 504 regarding the status of the electrical load 516. The load control circuit 508 may receive power via the hot connection 512 and the neutral connection 514 and may provide an amount of power to the electrical load 516. The electrical load 516 may include any type of electrical load.

The control circuit 504 may be in communication with an actuator 518 (e.g., one or more buttons) that may be actuated by a user to communicate user selections to the control circuit 504. For example, the actuator 518 may be actuated to put the control circuit 504 in an association mode and/or communicate association messages from the load control device 500.

Figure 6:
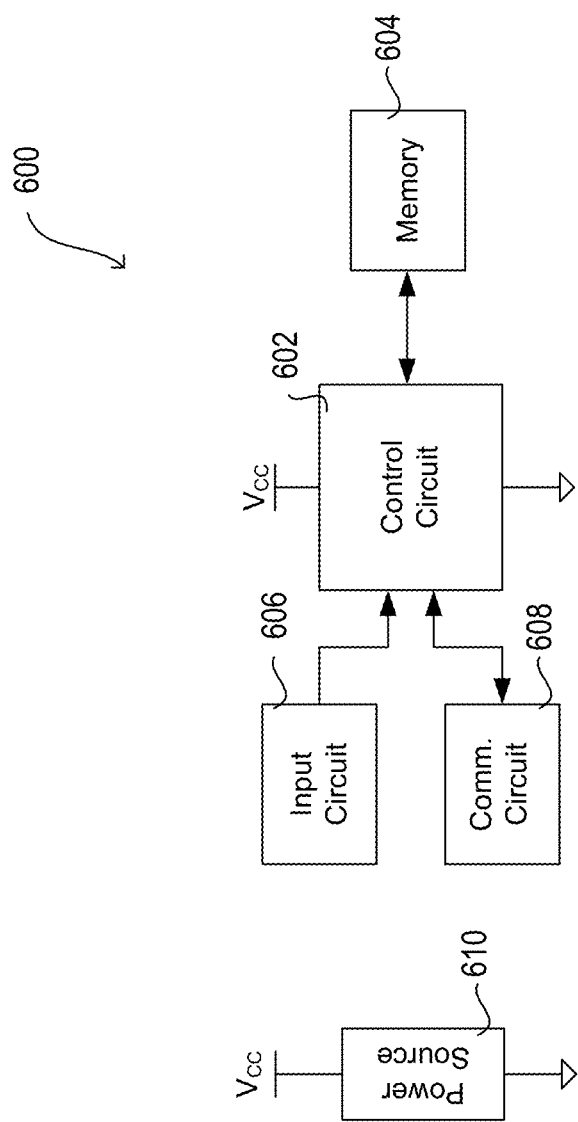
FIG. 6 is a block diagram of an example input device.

FIG. 6 is a block diagram illustrating an example input device 600 as described herein. The input device 600 may be a remote control device, an occupancy sensor, a daylight sensor, a window sensor, a temperature sensor, and/or the like. The input device 600 may include a control circuit 602 for controlling the functionality of the input device 600. The control circuit 602 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, power control, input/output processing, or any other functionality that enables the input device 600 to perform as described herein.

The control circuit 602 may store information in and/or retrieve information from the memory 604. The memory 604 may include a non-removable memory and/or a removable memory, as described herein.

The input device 600 may include a communications circuit 608 for transmitting and/or receiving information. The communications circuit 608 may transmit and/or receive information via wired and/or wireless communications. The communications circuit 608 may include a transmitter, an RF transceiver, or other circuit capable of performing wired and/or wireless communications. The communications circuit 608 may be in communication with control circuit 602 for transmitting and/or receiving information.

The control circuit 602 may also be in communication with an input circuit 606. The input circuit 606 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the input device may receive input from the input circuit 606 to put the control circuit 602 in an association mode and/or communicate association messages from the input device 600. The control circuit 602 may receive information from the input circuit 606 (e.g. an indication that a button has been actuated or sensed information). The input circuit 606 may be actuated as an on/off event. Each of the modules within the input device 600 may be powered by a power source 610.

The input circuit 606 may be part of a user interface for detecting user interface events. For example, the input circuit 606 may detect an actuation of a button on the user interface or a rotation of the user interface. The detected user interface events may be provided to the control circuit 602 for generating digital messages and/or performing control of electrical loads as described herein.

Figure 7:
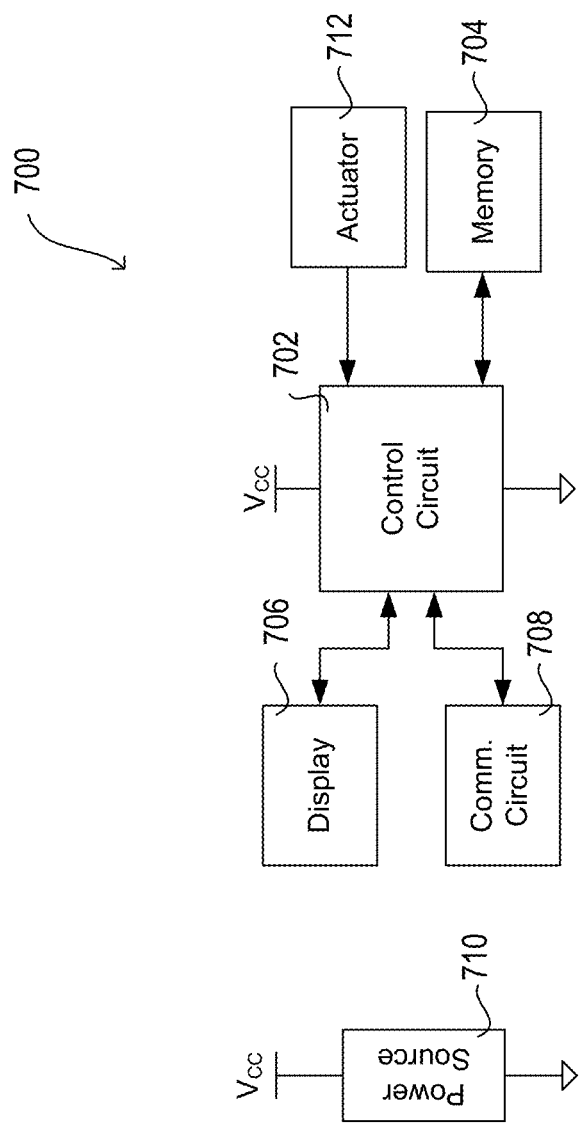
FIG. 7 is a block diagram of an example network device.

FIG. 7 is a block diagram illustrating an example network device 700 as described herein. The network device 700 may include the network device 190, for example. The network device 700 may include a control circuit 702 for controlling the functionality of the network device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the network device 700 to perform as described herein.

The control circuit 702 may store information in and/or retrieve information from the memory 704. The memory 704 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 700 may include a communications circuit 708 for transmitting and/or receiving information. The communications circuit 708 may perform wireless and/or wired communications. The communications circuit 708 may include an RF transceiver or other circuit capable of performing wireless communications via an antenna. Communications circuit 708 may be in communication with control circuit 702 for transmitting and/or receiving information.

The control circuit 702 may also be in communication with a display 706 for providing information to a user. The control circuit 702 and/or the display 706 may generate GUIs for being displayed on the network device 700. The display 706 and the control circuit 702 may be in two-way communication, as the display 706 may include a touch screen module capable of receiving information from a user and providing such information to the control circuit 702. The network device may also include an actuator 712 (e.g., one or more buttons) that may be actuated by a user to communicate user selections to the control circuit 702.

Each of the modules within the network device 700 may be powered by a power source 710. The power source 710 may include an AC power supply or DC power supply, for example. The power source 710 may generate a supply voltage $V_{CC}$ for powering the modules within the network device 700.

Figure 8:
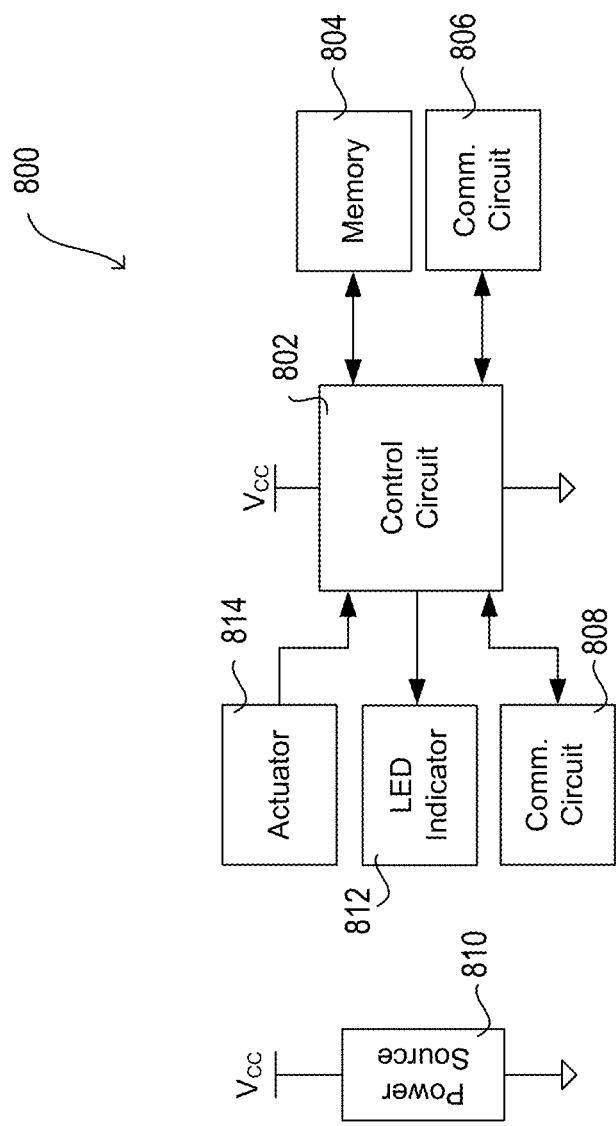
FIG. 8 is a block diagram of an example hub device.

FIG. 8 is a block diagram illustrating an example hub device 800 as described herein. The hub device 800 may include a control circuit 802 for controlling the functionality of the hub device 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the hub device 800 to perform as described herein.

The control circuit 802 may store information in and/or retrieve information from the memory 804. The memory 804 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The hub device 800 may include a communications circuit 806 for transmitting and/or receiving information. The communications circuit 806 may perform wireless and/or wired communications. The hub device 800 may also, or alternatively, include a communications circuit 808 for transmitting and/or receiving information. The communications circuit 808 may perform wireless and/or wired communications. Communications circuits 806 and 808 may be in communication with control circuit 802. The communications circuits 806 and 808 may include RF transceivers or other communications modules capable of performing wireless communications via an antenna. The communications circuit 806 and communications circuit 808 may be capable of performing communications via the same communication channels or different communication channels. For example, the communications circuit 806 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 808 may be capable of communicating (e.g., with control devices and/or other devices in the load control system) via another wireless communication channel (e.g., ZIGBEE®; WI-FI®; BLUETOOTH®; or a proprietary communication channel, such as CLEAR CONNECT™).

The control circuit 802 may be in communication with an LED indicator 812 for providing indications to a user. The control circuit 802 may be in communication with an actuator 814 (e.g., one or more buttons) that may be actuated by a user to communicate user selections to the control circuit 802. For example, the actuator 814 may be actuated to put the control circuit 802 in an association mode and/or communicate association messages from the hub device 800.

Each of the modules within the hub device 800 may be powered by a power source 810. The power source 810 may include an AC power supply or DC power supply, for example. The power source 810 may generate a supply voltage $V_{CC}$ for powering the modules within the hub device 800.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An input device for controlling an electrical load, the input device comprising:
    a user interface responsive to user interface events;
    a communication circuit configured to communicate messages; and
    a control circuit configured to:
        detect a user interface event at the user interface;
        determine whether the user interface event is configured to cause greater than a threshold amount of change at a load control device for controlling the electrical load;
        when the user interface event is determined to cause greater than the threshold amount of change at the load control device, transmit, via the communication circuit, a message as a multicast message; and when the user interface event is determined to cause less than the threshold amount of change at the load control device, transmit, via the communication circuit, the message as a unicast message to the load control device.

2. The input device of claim 1, wherein the user interface event is determined to cause greater than the threshold amount of change at the load control device when the user interface event is an ON event or an OFF event configured to turn the electrical load ON or OFF, respectively.

3. The input device of claim 1, wherein the user interface event is determined to cause greater than the threshold amount of change at the load control device when the user interface event is configured to move a position of a covering material of a motorized window treatment to a fully-open position or a fully-closed position.

4. The input device of claim 1, wherein the user interface event is a rotation of the user interface by a predefined distance or for a predefined time.

5. The input device of claim 1, wherein the threshold amount of change at the load control device is one of a change in a volume level, a change in a temperature level, a change in a lighting level, or a change in a level of a covering material for a window treatment.

6. The input device of claim 1, wherein the electrical load is a lighting load, wherein the user interface event is configured to cause greater than the threshold amount of change when an intensity level of the lighting load is to be increased or decreased by a first amount more than the threshold amount of change.

7. The input device of claim 1, wherein the electrical load is controlled by an audio device, wherein the user interface event is configured to cause greater than the threshold amount of change when a volume level of the audio device is to be increased or decreased by a first amount more than the threshold amount of change.

8. The input device of claim 1, wherein the electrical load is controlled by a temperature control device, wherein the user interface event is configured to cause greater than the threshold amount of change when a temperature level of the temperature control device is to be increased or decreased by a first amount more than the threshold amount of change.

9. The input device of claim 1, wherein the electrical load is controlled by a motor drive unit of a motorized window treatment, wherein the user interface event is configured to cause greater than the threshold amount of change when a level of a covering material of the motorized window treatment is to be raised or lowered by a first amount more than the threshold amount of change.

10. The input device of claim 1, wherein the user interface event is configured to generate a move-to-level command that is configured to cause greater than the threshold amount of change.

11. The input device of claim 10, wherein the electrical load is controlled by a motor drive unit of a motorized window treatment, and wherein the move-to-level command is configured to cause a covering material of the motorized window treatment to raise or lower by a first amount greater than the threshold amount of change.

12. The input device of claim 1, wherein the control circuit is configured to transmit a respective unicast message to each load control device of a plurality of load control devices when the user interface event is determined to cause less than the threshold amount of change at the load control device.

13. The input device of claim 12, wherein the control circuit is configured to calculate a delay to be provided between the transmission of each unicast message as a function of a number of the plurality of load control devices.

14. The input device of claim 1, wherein the input device is a retrofit remote control device capable of covering a switch.

15. The input device of claim 1, wherein the user interface event comprises a button press on the user interface, a button hold on the user interface, or a rotation of the user interface by a defined amount.

16. A load control system, comprising:
a load control device for controlling an amount of power provided to an electrical load; and
a remote control device configured to:
detect a user interface event;
determine whether the user interface event is configured to cause greater than a threshold amount of change at the load control device for controlling the electrical load;
when the user interface event is determined to cause greater than the threshold amount of change at the load control device, transmit a message as a multicast message; and
when the user interface event is determined to cause less than the threshold amount of change at the load control device, transmit the message as a unicast message to the load control device.

17. The load control system of claim 16, wherein the load control device is a lighting control device, wherein the electrical load is a lighting load, and wherein the user interface event is configured to cause greater than the threshold amount of change when an intensity level of the lighting load is to be increased or decreased by a first amount more than the threshold amount of change.

18. The load control system of claim 16, wherein the load control device is an audio device, wherein the user interface event is configured to cause greater than the threshold amount of change when a volume level of the audio device is to be increased or decreased by a first amount more than the threshold amount of change.

19. The load control system of claim 16, wherein the load control device is a temperature control device, wherein the user interface event is configured to cause greater than the threshold amount of change when a temperature level of the temperature control device is to be increased or decreased by a first amount more than the threshold amount of change.

20. The load control system of claim 16, wherein the electrical load is controlled by a motor drive unit of a motorized window treatment, wherein the user interface event is configured to cause greater than the threshold amount of change when a level of a covering material of the motorized window treatment is to be raised or lowered by a first amount more than the threshold amount of change.

* * * * *